US011588587B2

(12) United States Patent
Zhou et al.

(10) Patent No.: US 11,588,587 B2
(45) Date of Patent: Feb. 21, 2023

(54) NETWORK CODING TERMINATION AND PROCEDURES USING FEEDBACK

(71) Applicant: QUALCOMM Incorporated, San Diego, CA (US)

(72) Inventors: Shanyu Zhou, San Diego, CA (US); Jelena Damnjanovic, Del Mar, CA (US); Tao Luo, San Diego, CA (US); Sony Akkarakaran, Poway, CA (US); Jingchao Bao, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 165 days.

(21) Appl. No.: 17/209,980

(22) Filed: Mar. 23, 2021

(65) Prior Publication Data

US 2021/0336725 A1 Oct. 28, 2021

Related U.S. Application Data

(60) Provisional application No. 63/016,095, filed on Apr. 27, 2020.

(51) Int. Cl.
| | |
|---|---|
| *H04L 1/18* | (2006.01) |
| *H04L 1/1812* | (2023.01) |
| *H04L 1/1607* | (2023.01) |
| *H04W 80/02* | (2009.01) |
| *H04W 28/04* | (2009.01) |

(52) U.S. Cl.
CPC .......... *H04L 1/1819* (2013.01); *H04L 1/1642* (2013.01); *H04W 28/04* (2013.01); *H04W 80/02* (2013.01)

(58) Field of Classification Search
CPC ... H04L 1/1819; H04L 1/1642; H04L 1/0056; H04L 1/1671; H04L 1/1845; H04W 28/04; H04W 80/02
See application file for complete search history.

(56) References Cited

U.S. PATENT DOCUMENTS

| | | | |
|---|---|---|---|
| 2014/0341023 A1* | 11/2014 | Kim ...................... | H04W 40/12 |
| | | | 370/230.1 |
| 2021/0127296 A1* | 4/2021 | Aki ...................... | H04W 40/02 |
| 2022/0167184 A1* | 5/2022 | Zhou ...................... | H04W 24/04 |

FOREIGN PATENT DOCUMENTS

| | | | | |
|---|---|---|---|---|
| WO | WO-2015074279 A1 * | 5/2015 | ............... | H04L 1/00 |
| WO | WO-2018033069 A1 * | 2/2018 | ............... | H04L 1/00 |

* cited by examiner

*Primary Examiner* — Afshawn M Towfighi
(74) *Attorney, Agent, or Firm* — Patterson + Sheridan, LLP

(57) ABSTRACT

Certain aspects of the present disclosure provide techniques for efficiently terminating wireless transmissions of network coded packets, for example, between a base station and a user equipment (UE).

30 Claims, 8 Drawing Sheets

US 11,588,587 B2

NETWORK CODING TERMINATION AND PROCEDURES USING FEEDBACK

CROSS REFERENCE TO RELATED APPLICATION

This Application hereby claims priority under 35 U.S.C. § 119 to U.S. Provisional Patent Application No. 63/016,095, filed Apr. 27, 2020, the contents of which are incorporated herein in their entirety.

FIELD OF THE DISCLOSURE

Aspects of the present disclosure relate to wireless communications, and more particularly, to techniques for terminating network coding transmissions.

DESCRIPTION OF RELATED ART

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

In some examples, a wireless multiple-access communication system may include a number of base stations (BSs), which are each capable of simultaneously supporting communication for multiple communication devices, otherwise known as user equipments (UEs). In an LTE or LTE-A network, a set of one or more base stations may define an eNodeB (eNB). In other examples (e.g., in a next generation, a new radio (NR), or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more DUs, in communication with a CU, may define an access node (e.g., which may be referred to as a BS, 5G NB, next generation NodeB (gNB or gNodeB), transmission reception point (TRP), etc.). A BS or DU may communicate with a set of UEs on downlink channels (e.g., for transmissions from a BS or DU to a UE) and uplink channels (e.g., for transmissions from a UE to BS or DU).

These multiple access technologies have been adopted in various telecommunication standards to provide a common protocol that enables different wireless devices to communicate on a municipal, national, regional, and even global level. NR (e.g., new radio or 5G) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

BRIEF SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Certain aspects provide a method for wireless communications by a receiver device. The method generally includes buffering radio link control (RLC) protocol data units (PDUs) from a transmitter device, the RLC PDUs being generated from an original packet by using a network coding (NC) encoding algorithm, recovering the original packet from the buffered RLC PDUs by using an NC decoding algorithm at a network coding sublayer of the receiver device, generating a feedback, at the network coding sublayer, indicating a successful recovery of the original packet, and providing the feedback to the transmitter device.

Certain aspects provide a method for wireless communications by a transmitter device. The method generally includes generating encoded packets from an original packet using a network coding (NC) encoding algorithm, initiating a transmission of the encoded packets to a receiver device by forwarding the encoded packets to a radio link control (RLC) layer to generate RLC PDUs, receiving a feedback from the receiver device indicating a successful receipt of the original packet, and terminating the transmission of the encoded packets based on the feedback.

Certain aspects provide an apparatus for wireless communications by a receiver device. The apparatus generally includes means for buffering radio link control (RLC) protocol data units (PDUs) from a transmitter device, the RLC PDUs being generated from an original packet by using a network coding (NC) encoding algorithm, means for recovering the original packet from the buffered RLC PDUs by using an NC decoding algorithm at a network coding sublayer of the apparatus, means for generating a feedback, at the network coding sublayer, indicating a successful recovery of the original packet, and means for providing the feedback to the transmitter device.

Certain aspects provide an apparatus for wireless communications by a transmitter device. The apparatus generally includes means for generating encoded packets from an original packet using a network coding (NC) encoding algorithm, means for initiating a transmission of the encoded packets to a receiver device by forwarding the encoded packets to a radio link control (RLC) layer of the apparatus to generate RLC PDUs, means for receiving a feedback from the receiver device indicating a successful receipt of the original packet, and means for terminating the transmission of the encoded packets based on the feedback.

Certain aspects provide an apparatus for wireless communications by a receiver device. The apparatus generally includes a processing system configured to buffer radio link control (RLC) protocol data units (PDUs) from a transmitter device, the RLC PDUs being generated from an original packet by using a network coding (NC) encoding algorithm, recover the original packet from the buffered RLC PDUs by using an NC decoding algorithm at a network coding sublayer of the receiver device, generate a feedback, at the network coding sublayer, indicating a successful recovery of the original packet, and provide the feedback to the transmitter device.

Certain aspects provide an apparatus for wireless communications by a transmitter device. The apparatus generally includes a processing system configured to generate encoded packets from an original packet using a network coding (NC) encoding algorithm, initiate a transmission of the encoded packets to a receiver device by forwarding the encoded packets to a radio link control (RLC) layer to generate RLC PDUs, receive a feedback from the receiver device indicating a successful receipt of the original packet, and terminate the transmission of the encoded packets based on the feedback.

Certain aspects provide a wireless node. The wireless node generally includes a processing system configured to buffer radio link control (RLC) protocol data units (PDUs) from a transmitter device, the RLC PDUs being generated from an original packet by using a network coding (NC) encoding algorithm, recover the original packet from the buffered RLC PDUs by using an NC decoding algorithm at a network coding sublayer of the wireless node, and generate a feedback, at the network coding sublayer, indicating a successful recovery of the original packet, and a transmitter configured to transmit the feedback to the transmitter device.

Certain aspects provide a wireless node. The wireless node generally includes at least one antenna and a processing system configured to generate encoded packets from an original packet using a network coding (NC) encoding algorithm, initiate, via the at least one antenna, a transmission of the encoded packets to a receiver device by forwarding the encoded packets to a radio link control (RLC) layer of the wireless node to generate RLC PDUs, receive, via the at least one antenna, a feedback from the receiver device indicating a successful receipt of the original packet, and terminate the transmission of the encoded packets based on the feedback.

Certain aspects provide a computer-readable medium for wireless communications. The computer-readable medium generally includes instructions executable to buffer radio link control (RLC) protocol data units (PDUs) from a transmitter device, the RLC PDUs being generated from an original packet by using a network coding (NC) encoding algorithm, recover the original packet from the buffered RLC PDUs by using an NC decoding algorithm at a network coding sublayer, generate a feedback, at the network coding sublayer, indicating a successful recovery of the original packet, and provide the feedback to the transmitter device.

Certain aspects provide a computer-readable medium for wireless communications. The computer-readable medium generally includes instructions executable to generate encoded packets from an original packet using a network coding (NC) encoding algorithm, initiate a transmission of the encoded packets to a receiver device by forwarding the encoded packets to a radio link control (RLC) layer to generate RLC PDUs, receive a feedback from the receiver device indicating a successful receipt of the original packet, and terminate the transmission of the encoded packets based on the feedback.

Certain aspects provide means for, apparatus, and/or computer readable medium having computer executable code stored thereon, for performing the techniques described herein.

To the accomplishment of the foregoing and related ends, the one or more aspects include the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
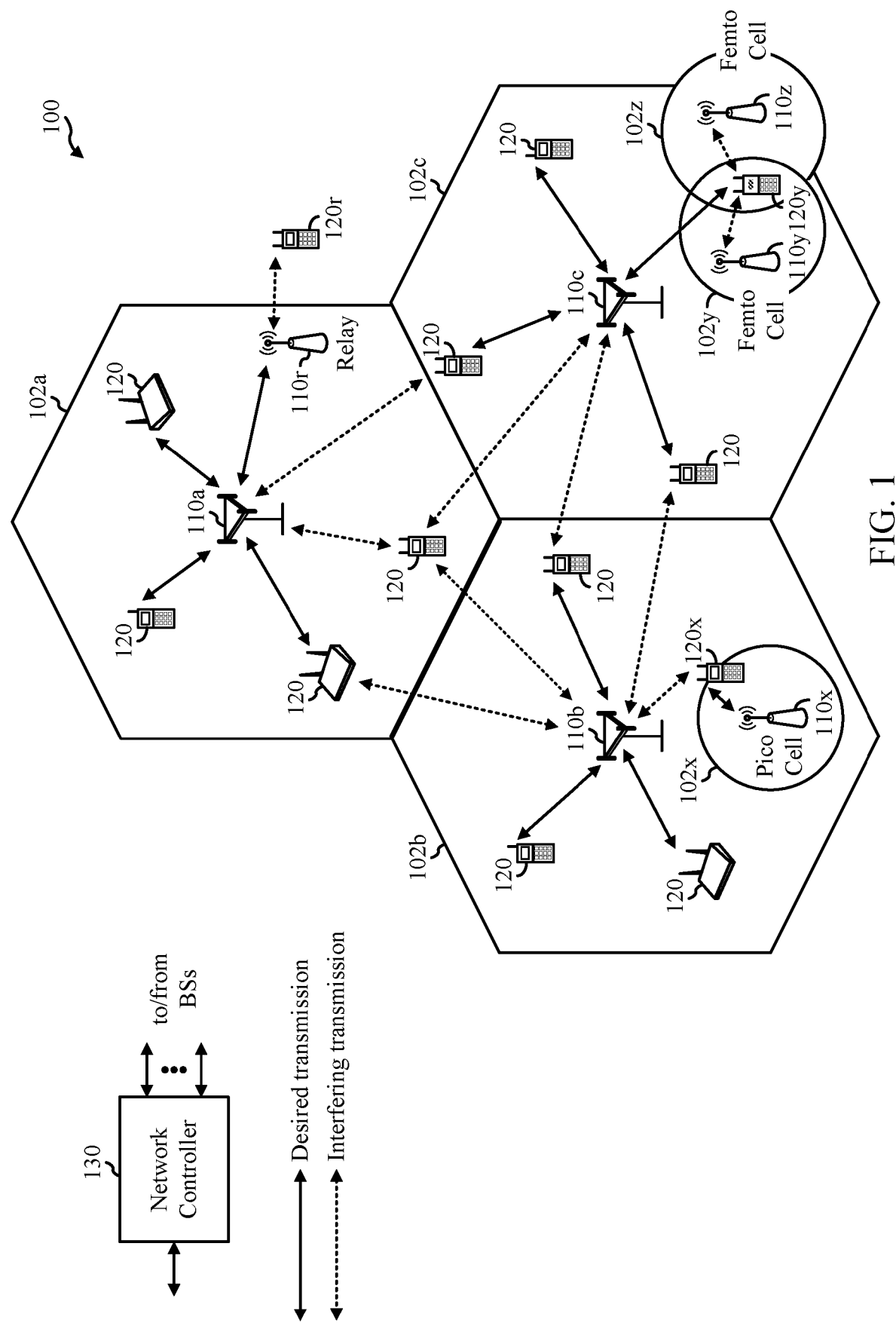
FIG. 1 is a block diagram conceptually illustrating an example telecommunications system, in accordance with certain aspects of the present disclosure.

Aspects of the present disclosure relate to wireless communications, and more particularly, to techniques for utilizing network coding for efficient termination of a wireless packet sent using a network coding sublayer.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication technologies, such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS).

New Radio (NR) is an emerging wireless communications technology under development in conjunction with the 5G Technology Forum (5GTF). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

New radio (NR) access (e.g., 5G technology) may support various wireless communication services, such as enhanced mobile broadband (eMBB) targeting wide bandwidth (e.g., 80 MHz or beyond), millimeter wave (mmW) targeting high carrier frequency (e.g., 25 GHz or beyond), massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe.

Example Wireless Communications System

FIG. 1 illustrates an example wireless communication network 100 in which aspects of the present disclosure may be performed. For example, UEs 120 and/or BS 110 of FIG. 1 may be configured to perform operations described below with reference to FIGS. 5 and 6 for efficient and reliable wireless packet transmission using a network coding sublayer.

As illustrated in FIG. 1, the wireless communication network 100 may include a number of base stations (BSs) 110 and other network entities. ABS may be a station that communicates with user equipments (UEs). Each BS 110 may provide communication coverage for a particular geographic area. In 3GPP, the term "cell" can refer to a coverage area of a Node B (NB) and/or a NB subsystem serving this coverage area, depending on the context in which the term is used. In NR systems, the term "cell" and next generation NodeB (gNB or gNodeB), NR BS, 5G NB, access point (AP), or transmission reception point (TRP) may be interchangeable. In some examples, a cell may not necessarily be stationary, and the geographic area of the cell may move according to the location of a mobile BS. In some examples, the base stations may be interconnected to one another and/or to one or more other base stations or network nodes (not shown) in wireless communication network 100 through various types of backhaul interfaces, such as a direct physical connection, a wireless connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs. In some cases, NR or 5G RAT networks may be deployed.

A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. ABS may support one or multiple (e.g., three) cells.

Wireless communication network 100 may also include relay stations. A relay station is a station that receives a transmission of data and/or other information from an upstream station (e.g., a BS or a UE) and sends a transmission of the data and/or other information to a downstream station (e.g., a UE or a BS). A relay station may also be a UE that relays transmissions for other UEs. In the example shown in FIG. 1, a relay station 110*r* may communicate with the BS 110*a* and a UE 120*r* in order to facilitate communication between the BS 110*a* and the UE 120*r*. A relay station may also be referred to as a relay BS, a relay, etc.

Wireless communication network 100 may be a heterogeneous network that includes BSs of different types, e.g., macro BS, pico BS, femto BS, relays, etc. These different types of BSs may have different transmit power levels, different coverage areas, and different impact on interference in the wireless communication network 100. For example, macro BS may have a high transmit power level (e.g., 20 Watts) whereas pico BS, femto BS, and relays may have a lower transmit power level (e.g., 1 Watt).

Wireless communication network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

A network controller 130 may couple to a set of BSs and provide coordination and control for these BSs. The network controller 130 may communicate with the BSs 110 via a backhaul. The BSs 110 may also communicate with one another (e.g., directly or indirectly) via wireless or wireline backhaul.

The UEs 120 (e.g., 120*x*, 120*y*, etc.) may be dispersed throughout the wireless communication network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node (e.g. UE or BS) may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz). Consequently, the nominal Fast Fourier Transfer (FFT) size may be equal to 128, 256, 512, 1024 or 2048 for system bandwidth of 1.25, 2.5, 5, 10, or 20 megahertz (MHz), respectively. The system bandwidth may also be partitioned into subbands. For example, a subband may cover 1.08 MHz (i.e., 6 resource blocks), and there may be 1, 2, 4, 8, or 16 subbands for system bandwidth of 1.25, 2.5, 5, 10 or 20 MHz, respectively.

While aspects of the examples described herein may be associated with LTE technologies, aspects of the present disclosure may be applicable with other wireless communications systems, such as NR. NR may utilize OFDM with a CP on the uplink and downlink and include support for half-duplex operation using TDD. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

In FIG. 1, a solid line with double arrows indicates desired transmissions between a UE and a serving BS, which is a BS designated to serve the UE on the downlink and/or uplink. A finely dashed line with double arrows indicates interfering transmissions between a UE and a BS.

Figure 2:
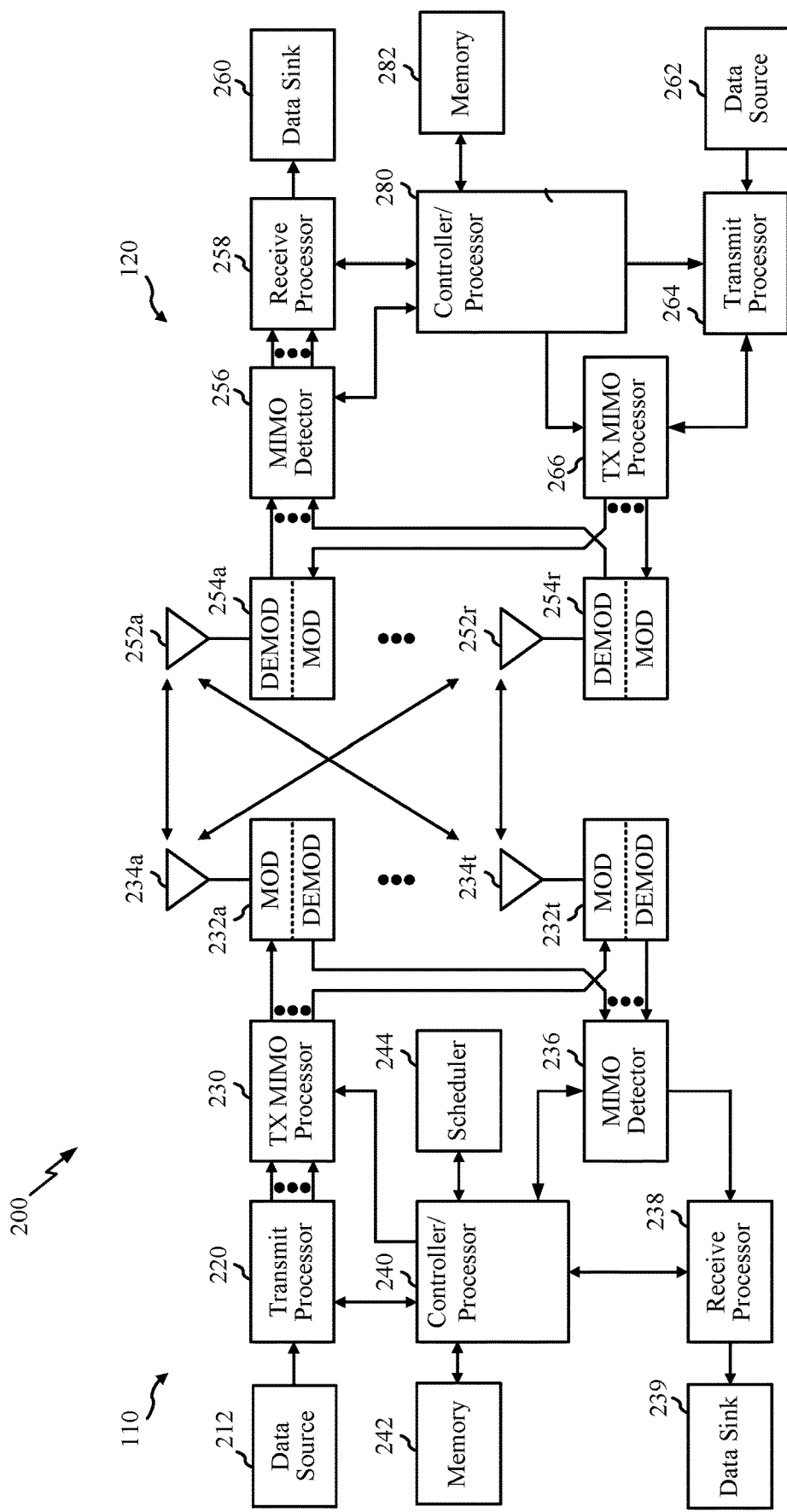
FIG. 2 is a block diagram conceptually illustrating a design of an example base station (BS) and user equipment (UE), in accordance with certain aspects of the present disclosure.

FIG. 2 shows a block diagram illustrating an example base station (BS) and an example user equipment (UE) in accordance with some aspects of the present disclosure.

At the BS 110, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. The processor 220 may process (for example, encode and symbol map) the data and control information to obtain data symbols and control symbols, respectively. The transmit processor 220 may also generate reference symbols, such as for the primary synchronization signal (PSS), secondary synchronization signal (SSS), and cell-specific reference signal (CRS). A transmit (TX) multiple-input multiple-output (MIMO) processor 230 may perform spatial processing (for example, precoding) on the data symbols, the control symbols, or the reference symbols, if applicable, and may provide output symbol streams to the modulators (MODs) 232a-232t. Each modulator 232 may process a respective output symbol stream (for example, for OFDM, etc.) to obtain an output sample stream. Each modulator may further process (for example, convert to analog, amplify, filter, and upconvert) the output sample stream to obtain a downlink signal. Downlink signals from modulators 232a-232t may be transmitted via the antennas 234a-234t, respectively.

At the UE 120, the antennas 252a-252r may receive the downlink signals from the BS 110 and may provide received signals to the demodulators (DEMODs) in transceivers 254a-254r, respectively. Each demodulator 254 may condition (for example, filter, amplify, downconvert, and digitize) a respective received signal to obtain input samples. Each demodulator may further process the input samples (for example, for OFDM, etc.) to obtain received symbols. A MIMO detector 256 may obtain received symbols from all the demodulators 254a-254r, perform MIMO detection on the received symbols if applicable, and provide detected symbols. A receive processor 258 may process (for example, demodulate, deinterleave, and decode) the detected symbols, provide decoded data for the UE 120 to a data sink 260, and provide decoded control information to a controller/processor 280.

On the uplink, at UE 120, a transmit processor 264 may receive and process data (for example, for the physical uplink shared channel (PUSCH)) from a data source 262 and control information (for example, for the physical uplink control channel (PUCCH)) from the controller/processor 280. The transmit processor 264 may also generate reference symbols for a reference signal (for example, for the sounding reference signal (SRS)). The symbols from the transmit processor 264 may be precoded by a TX MIMO processor 266 if applicable, further processed by the demodulators in transceivers 254a-254r (for example, for SC-FDM, etc.), and transmitted to the BS 110. At the BS 110, the uplink signals from the UE 120 may be received by the antennas 234, processed by the modulators 232, detected by a MIMO detector 236 if applicable, and further processed by a receive processor 238 to obtain decoded data and control information sent by the UE 120. The receive processor 238 may provide the decoded data to a data sink 239 and the decoded control information to the controller/processor 240.

The memories 242 and 282 may store data and program codes for BS 110 and UE 120, respectively. A scheduler 244 may schedule UEs for data transmission on the downlink or uplink.

Figure 5:
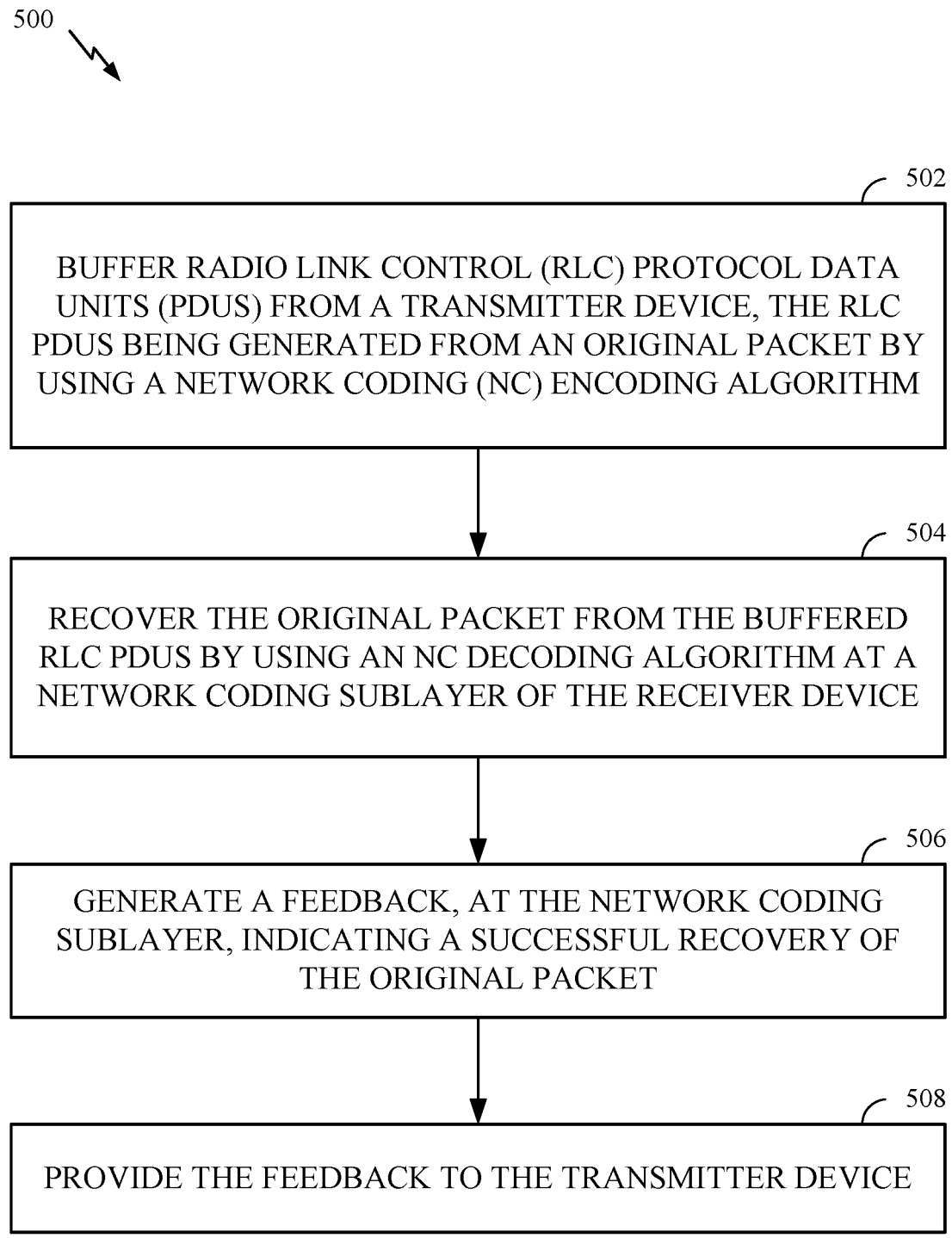
FIG. 5 illustrates example operations that may be performed by a receiver device, in accordance with certain aspects of the present disclosure.
Figure 6:
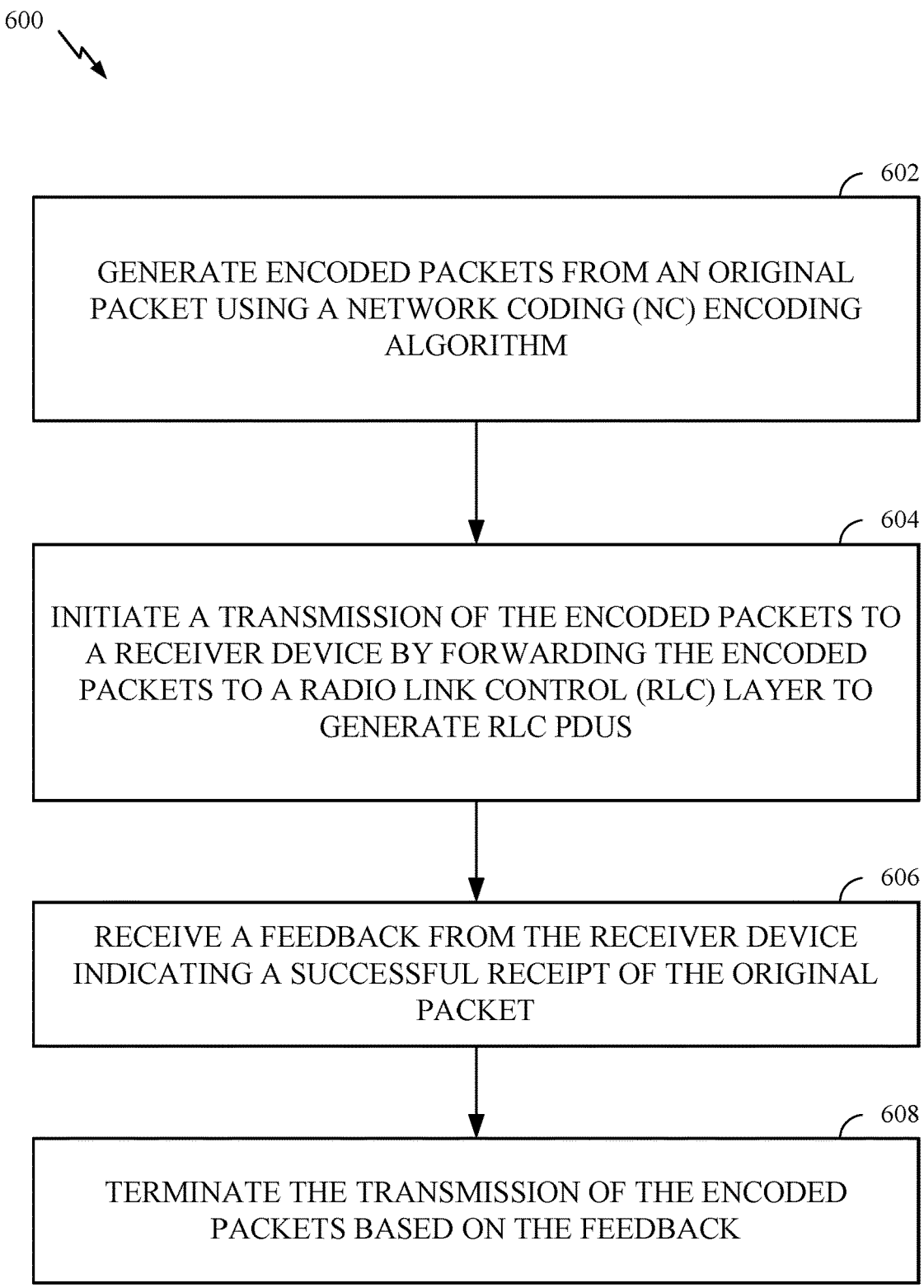
FIG. 6 illustrates example operations that may be performed by a transmitter device, in accordance with certain aspects of the present disclosure.

The controller/processor 280 (and/or other processors and modules) at the UE 120 and/or the controller/processor 240 (and/or other processors and modules) of the BS 110 may direct perform or direct the execution of processes for the techniques described herein (e.g., with reference to FIGS. 5 and 6).

Example Network Coding Wireless Packet Transmission Termination

Aspects of the present disclosure relate to wireless communications, and more particularly, to techniques for wireless communications using network coding. As will be described in greater detail below, different types of signaling at various protocol stack layers (e.g., PDCP, RLC, and MAC) may be used to efficiently terminate wireless transmission of network coded packets.

Network coding (NC) generally refers to a technique where operations (e.g., algebraic algorithms), are performed on packets as they pass through nodes within a network. This is in contrast to traditional routing networks, where packets are simply cached and then forwarded to the next node downstream in the network. NC typically merges relevant messages at a node, using a given encoding, then forwards the accumulated result to a destination/receiver for decoding.

Figure 3A:
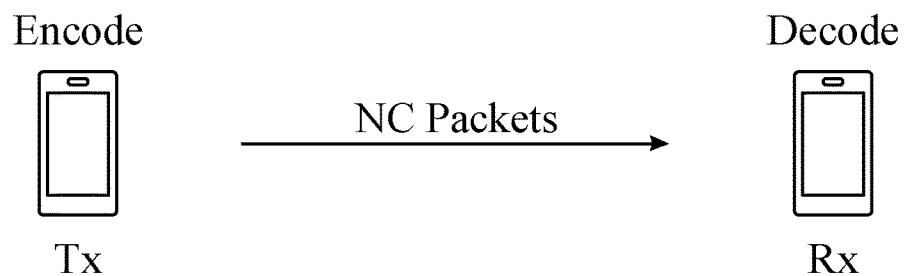
FIGS. 3A and 3B illustrate an example network coding example.
Figure 3B:
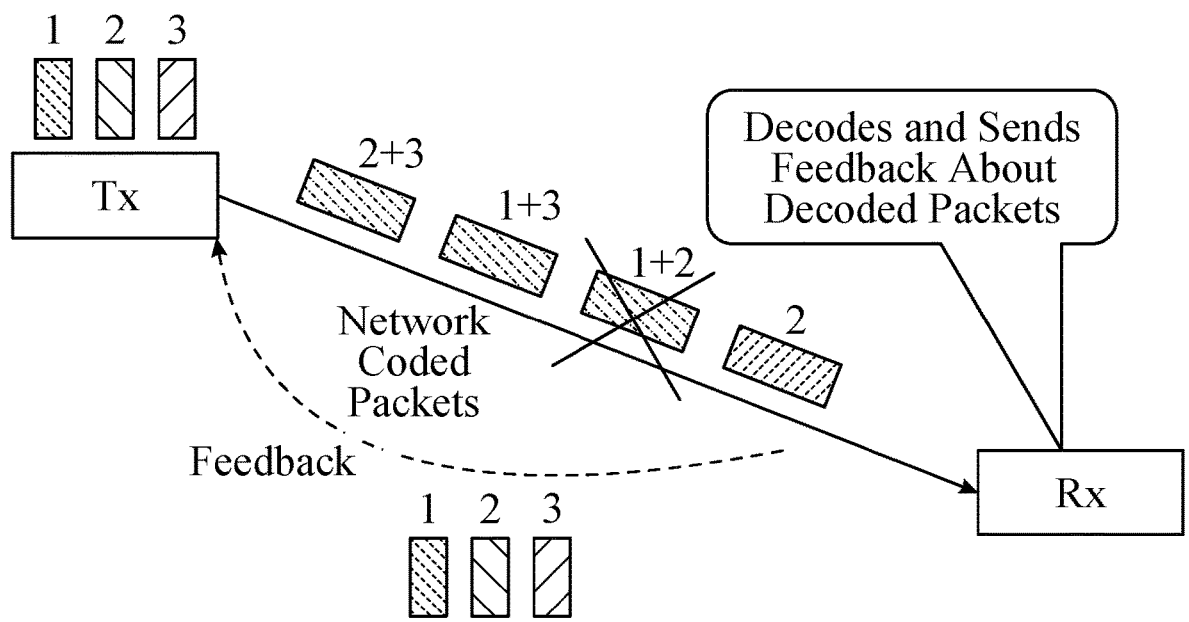

FIGS. 3A and 3B illustrate a simple scenario utilizing NC. As shown in FIG. 3A, a transmitter device (Tx) generates and sends network coded packets to a receiver device (Rx). The transmitter device (also referred to as a transmitter node, transmitter, encoder node, or encoder) and/or the receiver device (also referred to as a receiver node, receiver, decoder node, or decoder) may be any type of UE, base station, an integrated access and backhaul (IAB) device, and/or the like.

As shown in FIG. 3B, the transmitter device may generate the network coded packets from a set of original (or source) packets (p1, p2, and p3). As illustrated, the network coded packets may be the same as a source packet or may include some combination of source packets (e.g., a linear combination of a subset of the source packets). The techniques described herein may be used to terminate wireless transmission of packets sent using network coding performed using any type of network coding scheme, such as fountain coding, linear network coding, random linear network coding, Luby transform (LT) network coding and/or Raptor network coding.

As shown in FIG. 3B, the number of encoded packets is typically greater than the number of source packets to provide redundancy and increase reliability. In the example illustrated in FIG. 3B, the transmitter device encodes K original packets (where K=3) into N network coded packets (where N=4). As shown, the three source packets (p1, p2, and p3) are encoded into four network coded packets: p2, p1+p2, p1+p3, and p2+p3. N is typically calculated through the encoding function, which takes into account factors such as targeted error rate, encoding parameters, computation resources, redundancy budget, and the like. N can also be set larger than the calculated result to address unpredicted transmission loss.

The receiver receives the encoded packets and uses a (network coding) decoding algorithm to recover the original packet. For example, the decoding algorithm can be a belief propagation (BP) decoding algorithm. The redundant information carried in the encoded packets may help the receiver device recover the source packets even if all of the network coded packets are not successfully decoded. For example, assuming the receiver does not successfully decode network coded packet p1+p2 (as indicated by the X), the receiver may still be able to recover the source packets as there is sufficient information in the other network coded packets. For example, the receiver may first decode NC packet p2. Using the information for packet p2, the receiver may obtain p3 after decoding NC packet p2+p3 (because the receiver has already decoded p2 and can use combining to obtain p3 from p2+p3). In a similar manner, the receiver can obtain p1 from the NC packet p1+p3 (because the receiver has already decoded p3 and can use combining to obtain p1 from p1+p3).

As illustrated, in some cases, the receiver may provide feedback to inform transmitter to stop a current transmission and move on to next transmission. In the example illustrated in FIG. 3B, the receiver indicates the three source packets (p1, p2, and p3) were successfully decoded.

Figure 4:
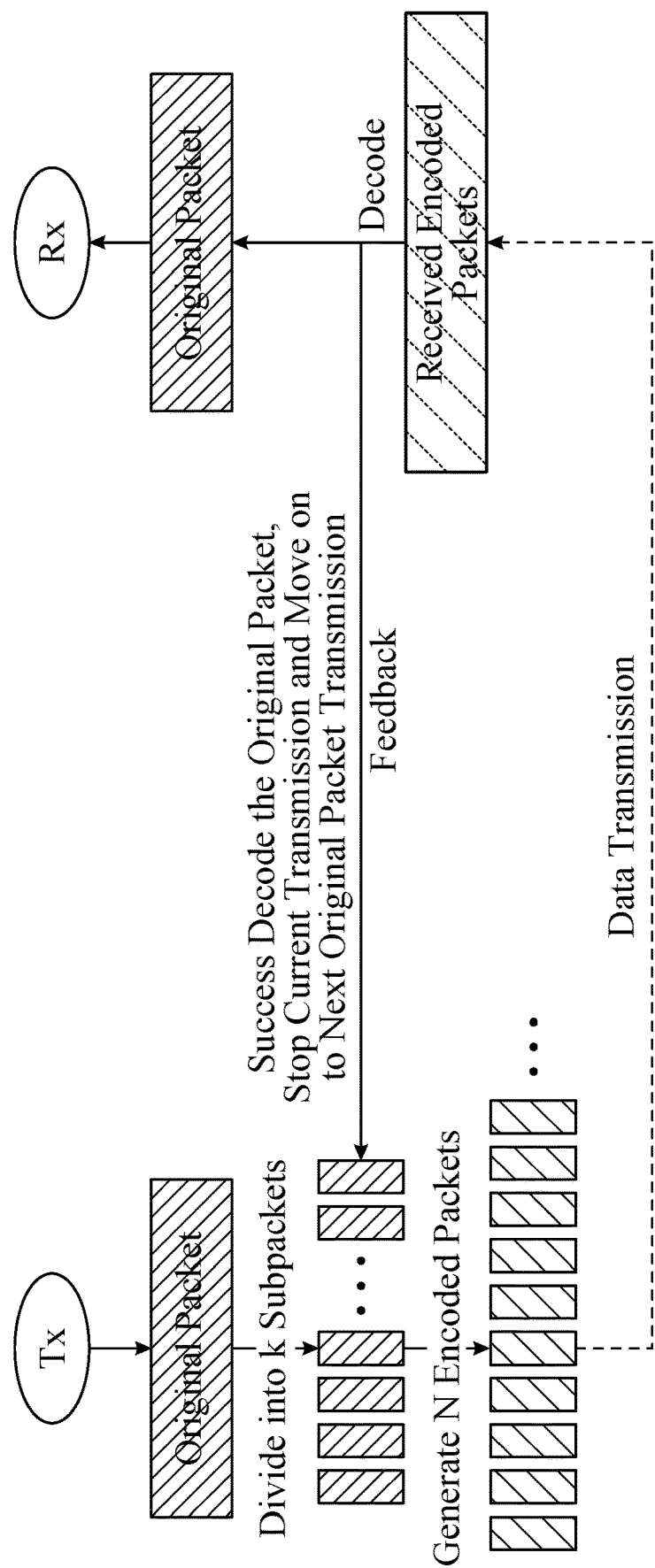
FIG. 4 illustrates an example network coding example, in which aspects of the present disclosure may be utilized.

As illustrated in FIG. 4, such feedback may provide an indication the receiver successfully decoded (recovered) the original packet from the network coded packets. As such, the feedback may prompt the receiver to terminate the current transmission (e.g., flush queued coded packets) and move on to begin transmission of a next original packet. In some cases, the feedback may include information regarding the decoding process (e.g., a number of RLC PDUs used to recover the original packet or a number of iterations used to successfully recover of the original packet), which may be used to update the network coding scheme.

Aspects of the present disclosure provide options for providing feedback at various protocol stack layers (e.g., PDCP, RLC, and MAC) that may be used to efficiently terminate wireless transmission of network coded packets.

FIG. 5 illustrates example operations 500 that may be performed by a transmitter device, in accordance with certain aspects of the present disclosure. For example, operations 500 may be performed by one of the UEs or base stations of FIG. 1 or FIG. 2 to efficiently and reliably terminate wireless transmission of a network coded packet to a receiver device.

Operations 500 begin, at 502, by generating encoded packets from an original packet using a network coding (NC) encoding algorithm. At 504, the transmitter initiates a transmission of the encoded packets to a receiver device by forwarding the encoded packets to a radio link control (RLC) layer to generate RLC PDUs. At 506, the transmitter receives a feedback from the receiver device indicating a successful receipt of the original packet. At 508, the transmitter terminates the transmission of the encoded packets based on the feedback.

FIG. 6 illustrates example operations 600 that may be performed by a receiver device, in accordance with certain aspects of the present disclosure, and may be considered complementary to operations 500 of FIG. 5. For example, operations 600 may be performed by one of the UEs or base stations of FIG. 1 or FIG. 2 to process network coded packets from (and provided feedback for termination to) a transmitter performing operations 500 of FIG. 5.

Operations 600 begin, at 602, by buffering radio link control (RLC) protocol data units (PDUs) from a transmitter device, the RLC PDUs being generated from an original packet by using a network coding (NC) encoding algorithm. At 604, the receiver recovers the original packet from the buffered RLC PDUs by using an NC decoding algorithm at a network coding sublayer of the receiver device. At 606, the receiver generates a feedback, at the network coding sublayer, indicating a successful recovery of the original packet. At 608, the receiver provides the feedback to the transmitter device.

Operations 500 and 600 of FIGS. 5 and 6 may be described with reference to FIGS. 7-10, which illustrate how the termination feedback may be provided at various protocol stack layers (e.g., PDCP, RLC, and MAC).

Figure 7:
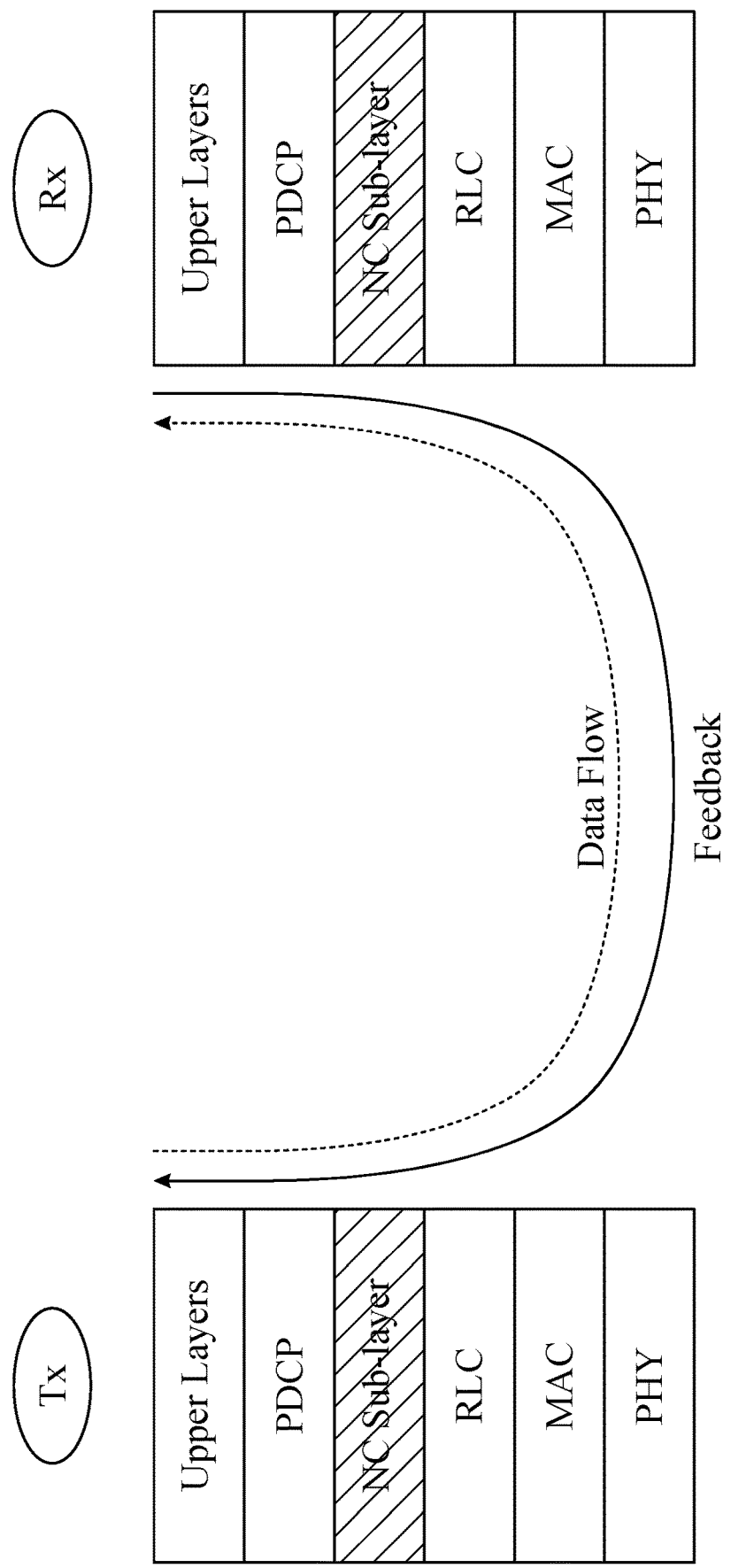
FIG. 7 is a diagram illustrating an example network coding sublayer, in accordance with certain aspects of the present disclosure.

FIG. 7 is a diagram illustrating an example protocol layer stack with a network coding (NC) sublayer, in accordance with certain aspects of the present disclosure. As described above with reference to FIG. 4, functionality of NC sublayer at the transmitter is to divide an incoming (original) packet from PDCP layer into small unencoded packets, encode these small packets using network coding algorithms, and forward the encoded packets to the RLC layer to form RLC PDUs.

At the receiver, functionality of the NC sublayer is to buffer received RLC PDU encoded packets from the RLC layer and decode buffered packets to recover the original packet, and push the recovered/decoded PDCP packets to the PDCP layer. As illustrated, the NC sublayer may also provide feedback to the transmitter to acknowledge successfully decoded PDCP packets, allowing the transmitter to terminate a current transmission and move on to a next packet.

Figure 8:
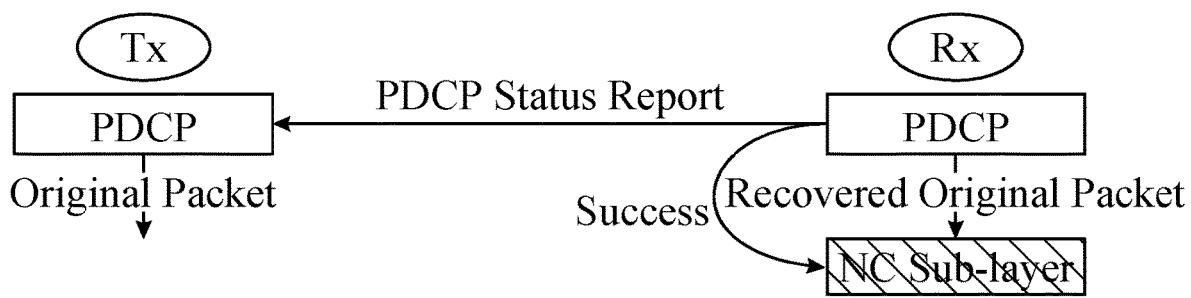
FIG. 8 illustrate an example of network coding feedback provided via a packet data convergence protocol (PDCP) status report, in accordance with certain aspects of the present disclosure.
Figure 9:
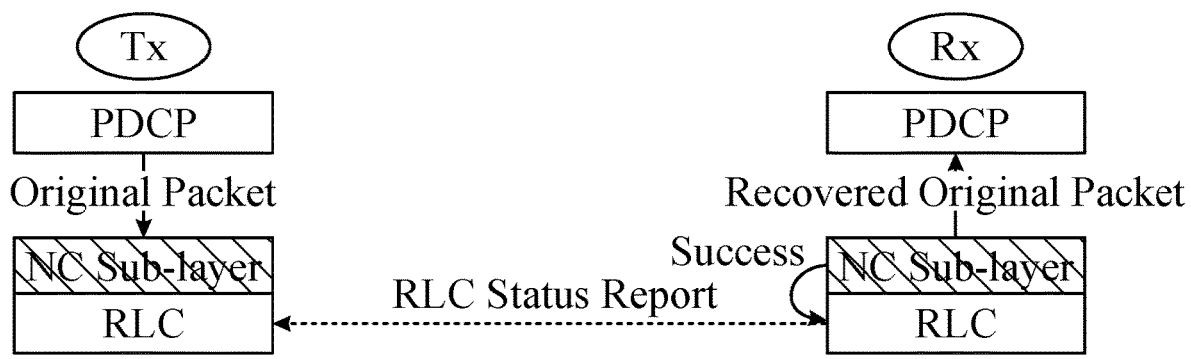
FIG. 9 illustrate an example of network coding feedback provided via a radio link control (RLC) status report, in accordance with certain aspects of the present disclosure.
Figure 10:
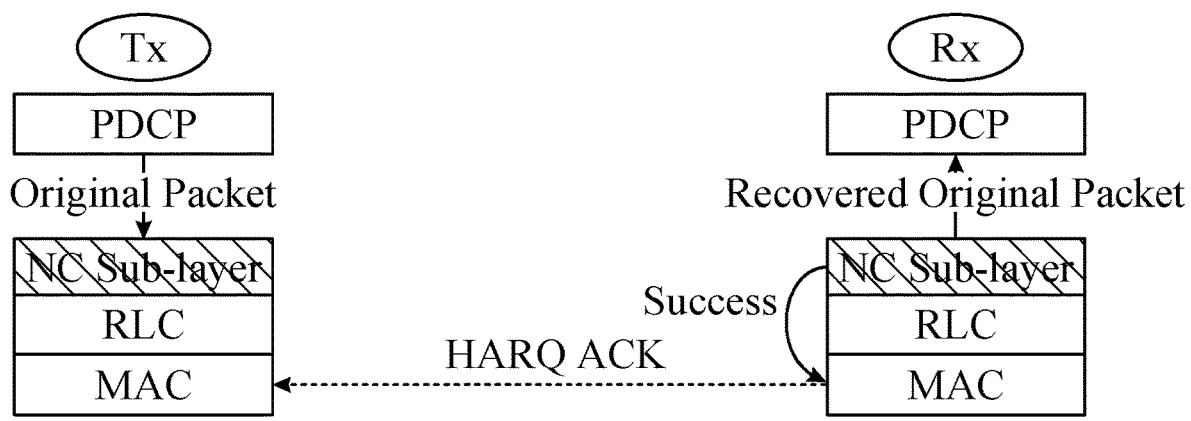
FIG. 10 illustrate an example of network coding feedback provided via a medium access control (MAC) layer acknowledgment, in accordance with certain aspects of the present disclosure.

FIGS. 8-10 illustrate how the feedback to acknowledge successfully decoded packets may be provided via various protocol stack layers.

FIG. 8 illustrates how feedback for network coding termination may be provided at the PDCP layer. As noted above, at the receiver, upon successfully decoding an original packet at the NC sub-layer, the recovered original packet is pushed up to PDCP layer. As illustrated in FIG. 8, the PDCP layer may generate a PDCP STATUS REPORT sent to transmitter to indicate success transmission of the original packet.

Upon receiving the PDCP STATUS REPORT at the PDCP layer, the transmitter may terminate a current network coded transmission. For example, the transmitter may instruct lower layers to discard any queued packets from previous transmission (e.g., of the packet being acknowledged) and initiate a new original packet transmission (e.g., with a new PDCP sequence number).

In some cases, the PDCP status report may also include decoding information at the receiver. For example, such decoding information may include a number of RLC PDUs used to recover the original packet and/or a number of iterations used to successfully recovery of the original packet. In some cases, the transmitter may updated the network coding algorithm (e.g., adjusting N or k) based on the decoding information.

FIG. 9 illustrates how feedback for network coding termination may be provided at the RLC layer. At the receiver, upon successfully decoding the original packet, the NC sub-layer may signal the RLC layer to generate an RLC status report to indicate success transmission of the original packet.

This RLC status report used to indicate success transmission of the original packet may be different from a traditional RLC status report, which is traditionally used to provide acknowledgment feedback (ACK/NACK success receipt/failure) of a particular RLC PDU or set of RLC PDUs.

Upon receiving the RLC status report, the transmitter discard any queued RLC PDUs, ignoring any previous RLC status report (with NACK) that indicates RLC retransmission, and prepare to receive and process new network coded packets (with a new PDCP sequence number).

As noted above with respect to the PDCP status report of FIG. 8, this special RLC status report used to indicate success transmission of the original packet may also include decoding information at the receiver. For example, such decoding information may include a number of RLC PDUs used to recover the original packet and/or a number of iterations used to successfully recovery of the original packet. As noted above with respect to such information provided via a PDCP status report, the transmitter may updated the network coding algorithm (e.g., adjusting N or k) based on the decoding information.

FIG. 10 illustrates how feedback for network coding termination may be provided at the MAC layer, as hybrid automatic retransmission request acknowledgment (HARQ-ACK) feedback. At the receiver, upon successfully decoding the original packet, the NC sub-layer signals MAC layer to (take action to) stop receiving new MAC PDUs.

There are various options to stop receiving new MAC PDUs. In some cases, a new logical channel (LCH) rule may be defined specifically for network coded packets. Such a rule may dictate that a MAC PDU containing network coded packets is not allowed to be multiplexed with other packets from a different logical channel (LCH). As such, upon successfully recovering an original network coded packet, the receiver can discard the entire MAC PDU and send a HARQ ACK, regardless of successful receipt of the entire MAC PDU or not. This may be possible because, as previously explained with reference to FIG. 3B, the redundant information carried in the encoded packets may help the receiver device recover the source packets even if all of the network coded packets are not successfully decoded.

Another option to allow the MAC layer to stop receiving new MAC PDUs is to define an indicator bit in a MAC PDU that indicates a multiplexing situation (e.g., whether or not a MAC PDU includes a network coded packets multiplexed with other packets from different LCHs). In this case, the MAC layer may only discard a MAC PDU containing network coded packets (i.e., that are not multiplexed with other packets from different LCH) and may send a HARQ ACK, regardless of successful receipt of the entire MAC PDU or not.

At the transmitter, since the MAC layer would only receive HARQ ACKs from the receiver upon successful transmission of the original packet, it will keep transmitting the MAC PDUs in the buffer until the upper layer initiates a new original packet transmission (with a new PDCP sequence number).

By providing various options for feedback at various protocol stack layers (e.g., PDCP, RLC, and MAC), aspects of the present disclosure provide flexibility for efficient termination of wireless transmission of network coded packets.

In addition to the various aspects described above, aspects of specific combinations are within the scope of the disclosure, some of which are detailed below:

Aspect 1: A method of wireless communications by a receiver device, including: buffering radio link control (RLC) protocol data units (PDUs) from a transmitter device, the RLC PDUs being generated from an original packet by using a network coding (NC) encoding algorithm; recovering the original packet from the buffered RLC PDUs by using an NC decoding algorithm at a network coding sublayer of the receiver device; generating a feedback, at the network coding sublayer, indicating a successful recovery of the original packet; and providing the feedback to the transmitter device.

Aspect 2: The method of Aspect 1, wherein the NC decoding algorithm involves at least one of Luby transform (LT) codes, Raptor codes, or belief propagation (BP) decoding to decode packets encoded using LT codes or Raptor codes.

Aspect 3: The method of any one of Aspects 1-2, wherein: the original packet includes an original packet data convergence protocol (PDCP) packet; and the transmitter device generated the RLC PDUs by dividing the original PDCP packet into source packets and generating the RLC PDUs from the source packets by using the NC encoding algorithm.

Aspect 4: The method of any one of Aspects 1-3, wherein the feedback is provided to the transmitter device via a PDCP status report.

Aspect 5: The method of Aspect 4, wherein: upon recovering the original PDCP packet from the buffered RLC PDUs, the network coding sublayer transfers the original PDCP packet to a PDCP layer of the receiver device; and the PDCP layer generates the PDCP status report upon receiving the original PDCP packet from the network coding sublayer.

Aspect 6: The method of Aspect 5, wherein the PDCP status report also includes decoding information at the receiver.

Aspect 7: The method of Aspect 6, wherein the decoding information includes at least one of a number of RLC PDUs used to recover the original packet or a number of iterations used to successfully recovery of the original packet.

Aspect 8: The method of any one of Aspects 1-7, wherein the feedback is provided to the transmitter device via a RLC status report designed to indicate successful recovery of the original packet.

Aspect 9: The method of Aspect 8, wherein: upon recovering the original PDCP packet from the buffered RLC PDUs, the network coding sublayer signals an RLC layer; and the RLC layer generates the RLC status report upon receiving the signaling from the network coding sublayer.

Aspect 10: The method of Aspect 8, wherein the RLC status report also includes decoding information at the receiver.

Aspect 11: The method of Aspect 10, wherein the decoding information includes at least one of a number of RLC PDUs used to recover the original packet or a number of iterations used to successfully recovery of the original packet.

Aspect 12: The method of any one of Aspects 1-11, wherein the feedback is provided to the transmitter device via a hybrid automatic repeat request (HARQ) acknowledgment feedback generated at a medium access control (MAC) layer of the receiver device.

Aspect 13: The method of Aspect 12, wherein: upon recovering the original PDCP packet from the buffered RLC PDUs, the network coding sublayer signals the MAC layer; and the MAC layer takes one or more actions to stop receiving at least one of new MAC PDUs in response to the signaling from the network coding sublayer.

Aspect 14: The method of Aspect 13, wherein, if any one of the new MAC PDUs containing network coded packets is not allowed to multiplex packets from a different logical channel, the one or more actions include: discarding the one MAC PDU in its entirety; and providing a HARQ acknowledgment regardless of whether the one MAC PDU is successfully received or not.

Aspect 15: The method of Aspect 13, wherein, if one of the new MAC PDUs containing a network coded packet indicates multiplexing of packets from a different logical channel is allowed, the one or more actions include: discarding any MAC PDU of the new MAC PDUs containing network coded packets not multiplexed with packets from a different logical channel; and providing a positive acknowledgment regardless of whether the one of the new MAC PDU is successfully received or not.

Aspect 16: A method of wireless communications by a transmitter device, including: generating encoded packets from an original packet using a network coding (NC) encoding algorithm; initiating a transmission of the encoded packets to a receiver device by forwarding the encoded packets to a radio link control (RLC) layer to generate RLC PDUs; receiving a feedback from the receiver device indicating a successful receipt of the original packet; and terminating the transmission of the encoded packets based on the feedback.

Aspect 17: The method of Aspect 16, wherein the NC encoding algorithm includes at least one of Luby transform (LT) network coding or Raptor network coding.

Aspect 18: The method of any one of Aspects 16-17, wherein: the original packet includes an original packet data convergence protocol (PDCP) packet; and the transmitter device generates the RLC PDUs by dividing the original PDCP packet into source packets and generating the encoded packets from the source packets by using the NC encoding algorithm.

Aspect 19: The method of any one of Aspects 16-18, wherein the feedback is received via a PDCP status report.

Aspect 20: The method of Aspect 19, further including: upon receiving the PDCP status report, discarding any queued encoded packets associated with the terminated transmission; and initiating a new original packet transmission with a new PDCP sequence number.

Aspect 21: The method of Aspect 20, wherein the PDCP status report also includes decoding information at the receiver.

Aspect 22: The method of Aspect 21, wherein the decoding information includes at least one of a number of RLC PDUs used to recover the original packet or a number of iterations used to successfully recovery of the original packet.

Aspect 23: The method of Aspect 21, further including updating the NC encoding algorithm based on the decoding information.

Aspect 24: The method of any one of Aspects 16-23, wherein the feedback is received via a RLC status report designed to indicate successful recovery of the original packet.

Aspect 25: The method of Aspect 19, further including: upon receiving the RLC status report, discarding any queued RLC PDUs associated with the terminated transmission.

Aspect 26: The method of Aspect 24, wherein the RLC status report also includes decoding information at the receiver.

Aspect 27: The method of Aspect 26, wherein the decoding information includes at least one of a number of RLC PDUs used to recover the original packet or a number of iterations used to successfully recovery of the original packet.

Aspect 28: The method of Aspect 26, further including updating the NC encoding algorithm based on the decoding information.

Aspect 29: The method of Aspect 25, further including ignoring any negative acknowledgment status report that indicates a retransmission of any of the discarded queued RLC PDUs.

Aspect 30: The method of any one of Aspects 16-29, wherein the feedback is received by a medium access control (MAC) layer of the transmitter device via a hybrid automatic repeat request (HARM) acknowledgment feedback.

Aspect 31: The method of Aspect 30, further including: continuing, via the MAC layer, to output MAC PDUs in a buffer for transmission until a higher layer initiates a new original packet transmission with a new PDCP sequence number.

Aspect 32: A wireless node, including means for performing the operations of one or more of Aspects 1-15.

Aspect 33: A wireless node, including a transceiver and processing system having at least one processor configured to perform the operations of one or more of Aspects 1-15.

Aspect 34: An apparatus of wireless communications by a receiver device, including: a processing system configured to buffer radio link control (RLC) protocol data units (PDUs) from a transmitter device, the RLC PDUs being generated from an original packet by using a network coding (NC) encoding algorithm, recover the original packet from the buffered RLC PDUs by using an NC decoding algorithm at a network coding sublayer of the receiver device, generate a feedback, at the network coding sublayer, indicating a successful recovery of the original packet, and provide the feedback to the transmitter device.

Aspect 35: A computer-readable medium for wireless communications, including codes executable by a wireless node to perform the operations of one or more of Aspects 1-15.

Aspect 36: A wireless node, including means for performing the operations of one or more of Aspects 16-31.

Aspect 37: A wireless node, including a transceiver and processing system having at least one processor configured to perform the operations of one or more of Aspects 16-31.

Aspect 38: An apparatus of wireless communications by a transmitter device, including: a processing system configured to generate encoded packets from an original packet using a network coding (NC) encoding algorithm, initiate a transmission of the encoded packets to a receiver device by forwarding the encoded packets to a radio link control (RLC) layer to generate RLC PDUs, obtain a feedback from the receiver device indicating a successful receipt of the original packet, and terminate the transmission of the encoded packets based on the feedback.

Aspect 39: A computer-readable medium for wireless communications, including codes executable by a wireless node to perform the operations of one or more of Aspects 16-31.

The methods disclosed herein include one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components. For example, various operations shown in FIGS. 5 and 6 may be performed by various processors shown in FIG. 2 of the BS 110 and/or UE 120.

For example, means for receiving may include a transceiver, a receiver or at least one antenna and at least one receive processor illustrated in FIG. 2. Means for transmitting, means for sending or means for outputting may include, a transceiver, a transmitter or at least one antenna and at least one transmit processor illustrated in FIG. 2. Means for buffering, means for recovering, means for generating, means for providing, means for initiating, means for terminating, means for discarding, means for updating, means for continuing and means for ignoring may include a processing system, which may include one or more processors, such as processors 258, 264 and 266, and/or controller/processor 280 of the UE 120 and/or processors 220, 230, 238, and/or controller/processor 240 of the BS 110 shown in FIG. 2.

In some cases, rather than actually transmitting a frame a device may have an interface to output a frame for transmission (a means for outputting). For example, a processor may output a frame, via a bus interface, to a radio frequency (RF) front end for transmission. Similarly, rather than actually receiving a frame, a device may have an interface to obtain a frame received from another device (a means for obtaining). For example, a processor may obtain (or receive) a frame, via a bus interface, from an RF front end for reception.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may include a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may include a single instruction, or many instructions, and may be distributed over several different code segments, among different programs, and across multiple storage media. The computer-readable media may include a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may include non-transitory computer-readable media (e.g., tangible media). In addition, for other aspects computer-readable media may include transitory computer-readable media (e.g., a signal). Combinations of the above should also be included within the scope of computer-readable media.

Thus, certain aspects may include a computer program product for performing the operations presented herein. For example, such a computer program product may include a computer-readable medium having instructions stored (and/or encoded) thereon, the instructions being executable by one or more processors to perform the operations described herein. For example, instructions for performing the operations described herein and illustrated in FIGS. 5 and 6.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method of wireless communications by a receiver device, comprising:
   buffering radio link control (RLC) protocol data units (PDUs) from a transmitter device, the RLC PDUs being generated from an original packet by using a network coding (NC) encoding algorithm;
   recovering the original packet from the buffered RLC PDUs by using an NC decoding algorithm at a network coding sublayer of the receiver device;
   generating a feedback, at the network coding sublayer, indicating a successful recovery of the original packet; and
   providing the feedback to the transmitter device.

2. The method of claim 1, wherein the feedback is provided to the transmitter device via a PDCP status report.

3. The method of claim 2, wherein:
   upon recovering the original PDCP packet from the buffered RLC PDUs, the network coding sublayer transfers the original PDCP packet to a PDCP layer of the receiver device; and
   the PDCP layer generates the PDCP status report upon receiving the original PDCP packet from the network coding sublayer.

4. The method of claim 3, wherein the PDCP status report also includes decoding information at the receiver.

5. The method of claim 4, wherein the decoding information comprises at least one of a number of RLC PDUs used to recover the original packet or a number of iterations used to successfully recovery of the original packet.

6. The method of claim 1, wherein the feedback is provided to the transmitter device via a RLC status report designed to indicate successful recovery of the original packet.

7. The method of claim 6, wherein:
   upon recovering the original PDCP packet from the buffered RLC PDUs, the network coding sublayer signals an RLC layer; and
   the RLC layer generates the RLC status report upon receiving the signaling from the network coding sublayer.

8. The method of claim 6, wherein the RLC status report also includes decoding information at the receiver.

9. The method of claim 8, wherein the decoding information comprises at least one of a number of RLC PDUs used to recover the original packet or a number of iterations used to successfully recovery of the original packet.

10. The method of claim 1, wherein the feedback is provided to the transmitter device via a hybrid automatic repeat request (HARQ) acknowledgment feedback generated at a medium access control (MAC) layer of the receiver device.

11. The method of claim 10, wherein:
   upon recovering the original PDCP packet from the buffered RLC PDUs, the network coding sublayer signals the MAC layer; and
   the MAC layer takes one or more actions to stop receiving at least one of new MAC PDUs in response to the signaling from the network coding sublayer.

12. The method of claim 11, wherein, if any one of the new MAC PDUs containing network coded packets is not allowed to multiplex packets from a different logical channel, the one or more actions comprise:
   discarding the one MAC PDU in its entirety; and
   providing a HARQ acknowledgment regardless of whether the one MAC PDU is successfully received or not.

13. The method of claim 11, wherein, if one of the new MAC PDUs containing a network coded packet indicates multiplexing of packets from a different logical channel is allowed, the one or more actions comprise:
- discarding any MAC PDU of the new MAC PDUs containing network coded packets not multiplexed with packets from a different logical channel; and
- providing a positive acknowledgment regardless of whether the one of the new MAC PDU is successfully received or not.

14. A method of wireless communications by a transmitter device, comprising:
- generating encoded packets from an original packet using a network coding (NC) encoding algorithm;
- initiating a transmission of the encoded packets to a receiver device by forwarding the encoded packets to a radio link control (RLC) layer to generate RLC PDUs;
- receiving a feedback from the receiver device indicating a successful receipt of the original packet; and
- terminating the transmission of the encoded packets based on the feedback.

15. The method of claim 14, wherein the NC encoding algorithm comprises at least one of Luby transform (LT) network coding or Raptor network coding.

16. The method of claim 14, wherein:
- the original packet comprises an original packet data convergence protocol (PDCP) packet; and
- the transmitter device generates the RLC PDUs by dividing the original PDCP packet into source packets and generating the encoded packets from the source packets by using the NC encoding algorithm.

17. The method of claim 14, wherein the feedback is received via a PDCP status report.

18. The method of claim 17, further comprising:
- upon receiving the PDCP status report, discarding any queued encoded packets associated with the terminated transmission; and
- initiating a new original packet transmission with a new PDCP sequence number.

19. The method of claim 18, wherein the PDCP status report also includes decoding information at the receiver.

20. The method of claim 19, wherein the decoding information comprises at least one of a number of RLC PDUs used to recover the original packet or a number of iterations used to successfully recovery of the original packet.

21. The method of claim 19, further comprising updating the NC encoding algorithm based on the decoding information.

22. The method of claim 14, wherein the feedback is received via a RLC status report designed to indicate successful recovery of the original packet.

23. The method of claim 17, further comprising:
- upon receiving the RLC status report, discarding any queued RLC PDUs associated with the terminated transmission.

24. The method of claim 22, wherein the RLC status report also includes decoding information at the receiver.

25. The method of claim 24, wherein the decoding information comprises at least one of a number of RLC PDUs used to recover the original packet or a number of iterations used to successfully recovery of the original packet.

26. The method of claim 24, further comprising updating the NC encoding algorithm based on the decoding information.

27. The method of claim 23, further comprising ignoring any negative acknowledgment status report that indicates a retransmission of any of the discarded queued RLC PDUs.

28. The method of claim 14, wherein the feedback is received by a medium access control (MAC) layer of the transmitter device via a hybrid automatic repeat request (HARM) acknowledgment feedback.

29. The method of claim 28, further comprising:
- continuing, via the MAC layer, to output MAC PDUs in a buffer for transmission until a higher layer initiates a new original packet transmission with a new PDCP sequence number.

30. A wireless node, comprising:
- at least one antenna; and
- a processing system configured to:
  - generate encoded packets from an original packet using a network coding (NC) encoding algorithm;
  - initiate, via the at least one antenna, a transmission of the encoded packets to a receiver device by forwarding the encoded packets to a radio link control (RLC) layer of the wireless node to generate RLC PDUs;
  - obtain, via the at least one antenna, a feedback from the receiver device indicating a successful receipt of the original packet; and
  - terminate the transmission of the encoded packets based on the feedback.

* * * * *